United States Patent Office 3,468,581
Patented Sept. 23, 1969

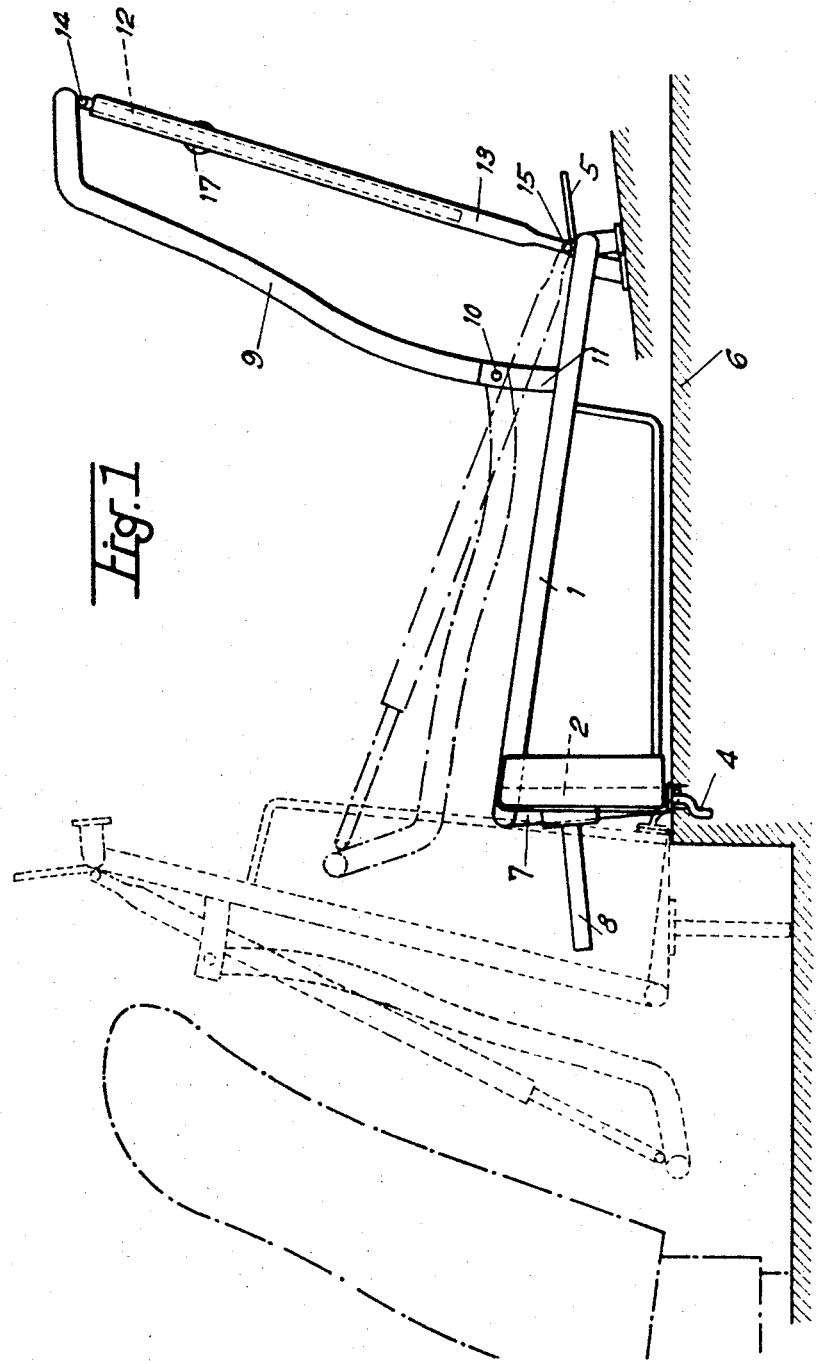

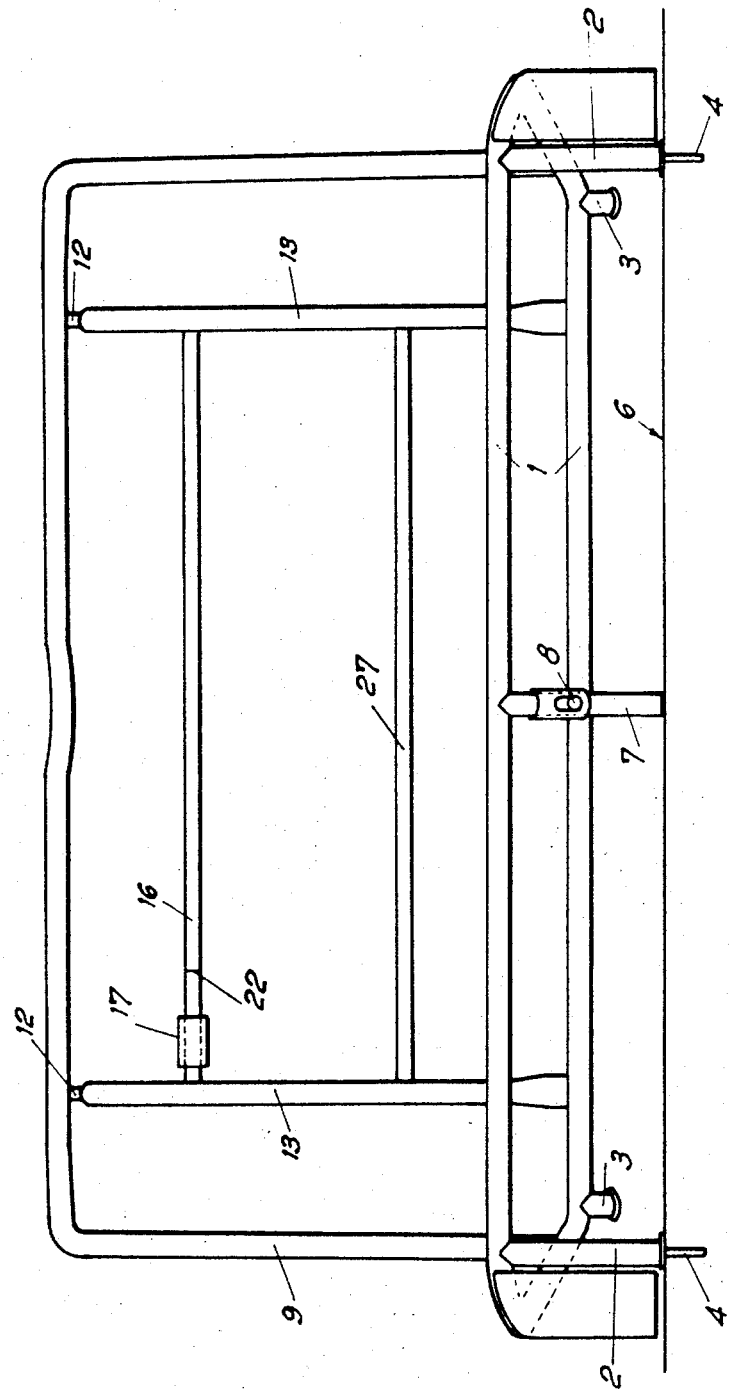

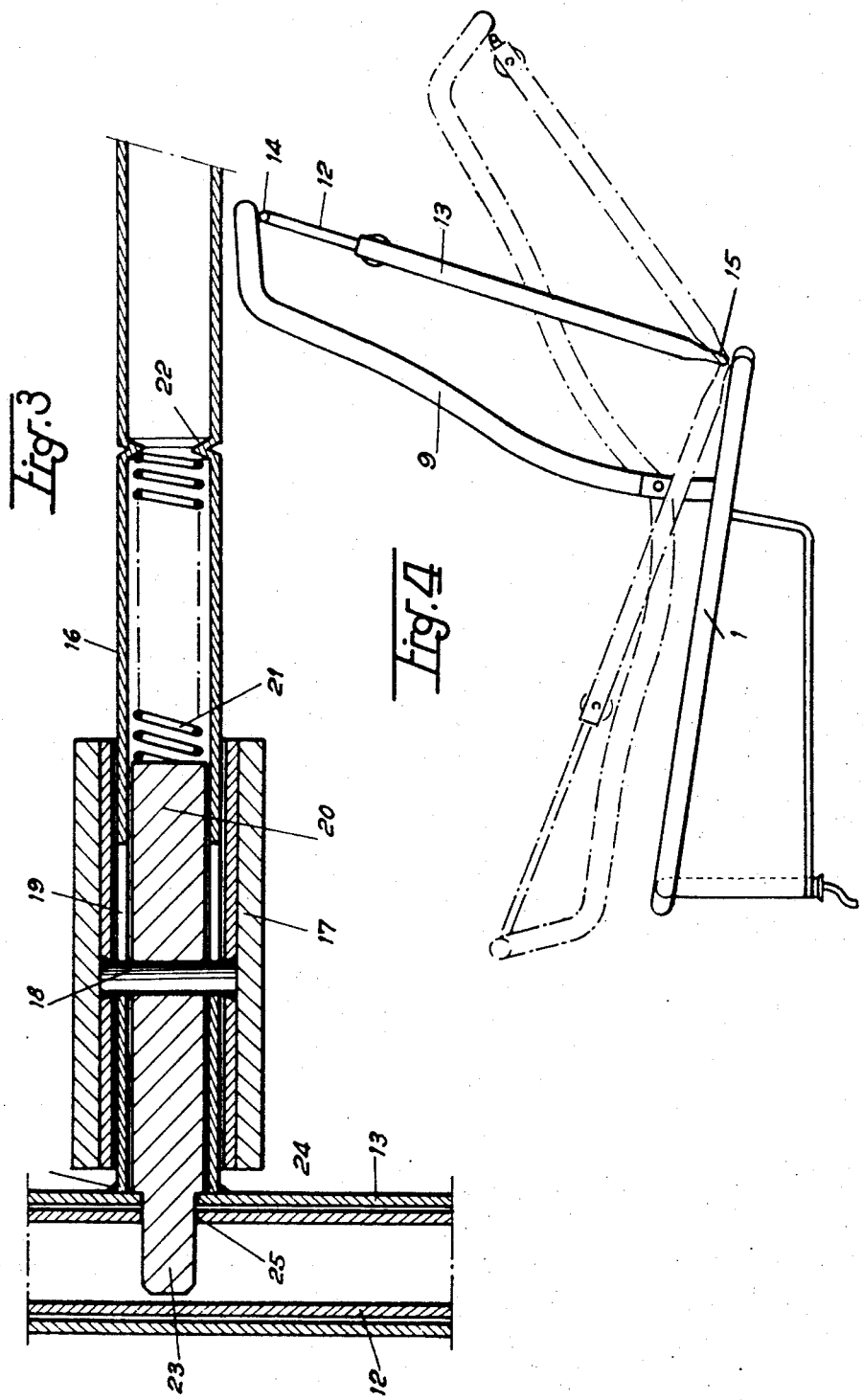

3,468,581
VEHICLE SEATS
Edmond Henry-Biabaud, Paris, France, assignor to Societe Anonyme Automobiles Citroen, Paris, France
Filed Dec. 5, 1967, Ser. No. 688,102
Claims priority, application France, Dec. 16, 1966, 87,781
Int. Cl. A47c *1/032;* B60n *1/06*
U.S. Cl. 297—341       7 Claims

ABSTRACT OF THE DISCLOSURE

A vehicle seat of the kind which is provided with a back which can be folded down onto the horizontal portion of the seat or alternatively folded backwardly to form a "couchette." The construction which enables this action to be carried out effectively includes telescopic uprights secured to the back of the seat which can be locked in any required position by means of a locking finger which is spring loaded to engage in holes both in an outer and in an inner member of each of the telescopic uprights. In a modification, three telescopic uprights are provided only one of which has a locking finger.

---

This invention relates to seats and in particular to seats having a back adapted to be adjusted from an upright position.

Seats have been proposed of which the back may be inclined with respect to the horizontal or flat part of the seat. However, such seats have up to the present time frequently included notched or locking members which are relatively complicated and of which the construction gives rise to problems relating to their rigidity, these problems being difficult to solve.

In certain previously proposed seats, the back is connected to the flat part of the seat by telescopic uprights which each comprise two members slidable one within the other and one of which at least is provided with means for locking the one with respect to the other of these two members, the one of the members of each of the uprights being pivoted on the upper part of the back, whilst the other is pivoted on the flat part of the seat, to the rear of the pivotal point of the back.

The present invention has for its object a seat in which the position of the back is readily controllable.

According to the present invention there is provided a seat comprising a back pivoted at its base on the flat part of the seat and connected to this flat part of the seat by at least two telescopic uprights each of which comprises two members slidable one within the other and of which at leatst one is provided with means for locking the one member with respect to the other of these two members, the said one of the members of each of the uprights being pivoted on the upper part of the back of the seat whilst the other member is pivoted on the flat part of the seat, rearwardly of the pivot of the back, the two outer members of the uprights being connected to one another by means comprising a transverse tube and a locking finger, which can engage in a hole of the outer member of one of the uprights and can engage in a hole of the inner member of this upright, and which is slidably mounted within this transverse tube.

Further according to the present invention there is provided a seat comprising a substantially horizontal portion, a back adjustable with respect to the horizontal portion, said back being secured to a plurality of telescopic assemblies which enable the back to take up any one of a plurality of positions relative to the horizontal portion, a transverse member interconnecting the telescopic assemblies and carrying detent means capable of locking at least one of the telescopic assemblies in a selected position.

Certain embodiments of seats in accordance with the invention will now be described, by way of example with reference to the accompanying diagrammatic drawings, in which:

FIGURE 1 is a side elevation of the framework of a seat in accordance with the invention;

FIGURE 2 is a front view of this framework;

FIGURE 3 is a view in section of the locking assembly provided for securing the back;

FIGURE 4 is a view similar to FIGURE 1 of a modification in accordance with the invention;

Figure 5:
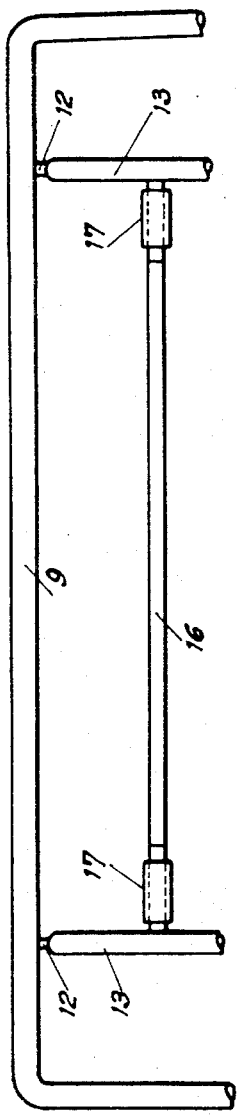
FIGURE 5 is a view from the front of a detail of another modification.

Referring now to the drawings, the vehicle seat comprises, in customary manner, a flat seat part on which is pivoted a back.

The seat comprises a frame 1, which is substantially rectangular, and which is provided at the front with feet 2 and at the rear with feet 3. Securing members 4 and 5, enable the feet 2 and 3 to be anchored to the floor 6 of the vehicle. At its front part, the frame 2 carries an upright member 7 to which an auxiliary foot 8 is adjustably secured. When, after having put the securing member 5 out of action, the frame 1 is pivoted forwardly about the securing members 4, this frame comes to rest on the floor through the intermediary of the auxiliary foot 8 (FIGURE 1); in this latter position of the assembly the flat part of the seat and back fold towards the front seat, whilst the members 4 remain engaged below the floor.

For its part, the back of the seat comprises a framework 9 of U shape and is pivotally mounted at 10 on extensions 11 rigid with the frame 1.

The flat part of the seat and the back are covered with resilient upholstery, for example including springs, and trim which, for the sake of clarity, are not shown in the drawings.

Telescopic uprights in the form of two tubes 12 and 13 connect the frame 9 to the frame 1, the inner tube 12 being pivoted at 14 on the frame 9 whilst the outer tube 13 is pivoted on the frame 1, about an axis 15 situated to the rear of the axis 10. It will be seen that under these conditions, the length of each of the telescopic uprights 12, 13 increases when the back is caused to pivot forwardly. Means are provided for locking one of the two tubes with respect to the other of at least one upright, which has the effect of securing the back with respect to the flat part of the seat.

In the embodiment of FIGURES 1 to 3, there are provided two telescopic uprights of which the outer tubes 13 are connected to one another by two transverse tubes 16 and 27.

An unlocking sleeve 17 is slidably mounted on one of the ends of the tube 16. This sleeve carries an internal pin 18 (FIGURE 3) which traverses an elongate slot 19 of the tube 16 whilst a locking finger 20 is slidably mounted on the interior of the tube 16. A spring 21, interposed between the finger 20 and a stop member, constituted for example by an internal shoulder 22 of the tube 16, urges the end 23 of the finger 20 to engage in a hole 24 of the adjacent outer tube 13 and in a corresponding one of a series of holes 25 of the inner tube 12.

When the end 23 of the finger 20 is thus engaged in the tubes 12 and 13, these two tubes are locked to one another and the back cannot pivot with respect to the flat part of the seat. If it is desired to alter the inclination of the back, it is sufficient to displace the sleeve 17 against the action of the spring 21 in order to disengage the locking finger of the tubes 12 and 13 and cause the back to pivot until another hole 25 of the tube 12 eventually arrives opposite the hole 24 of the tube 13.

In FIGURES 1 and 2, the tubes 12 and 13 are substantially completely lying one within the other when the back is in its normal position of use. The hole 25 is provided in the tube 12 for securing the two tubes 12 and 13 in this relative position. The back can thus be locked in its normal position and may however be, if it is desired, tilted forwardly, either alone as shown in chain lines in FIGURE 1, or together with the flat part of the seat, as shown in broken lines in this figure. If it is desired, the tube 12 may include similar holes to the hole 25 allowing the locking of the back in its folded down position and/or in positions intermediate the normal position and the folded down position.

In FIGURE 4 the external tube 13 is made shorter so that the position of the maximum overlap of the tubes 12 and 13 corresponds to a "couchette" position of the back. The internal tube 12 comprises a series of holes allowing the fixing of the back in the "couchette" position, in the normal position of use, as well as in intermediate positions and possibly in positions intermediate between the normal position and the forward folded down position.

As has been indicated hereinbefore, the embodiment of FIGURES 1 and 2, only one of the telescopic uprights 12 and 13 need be fixed in the selected position.

In contrast, in the modification of FIGURE 5, a sleeve 17 is provided at each of the ends of the tube 16 and allows adjustment of an adjacent locking finger of the telescopic upright.

Figure 6:
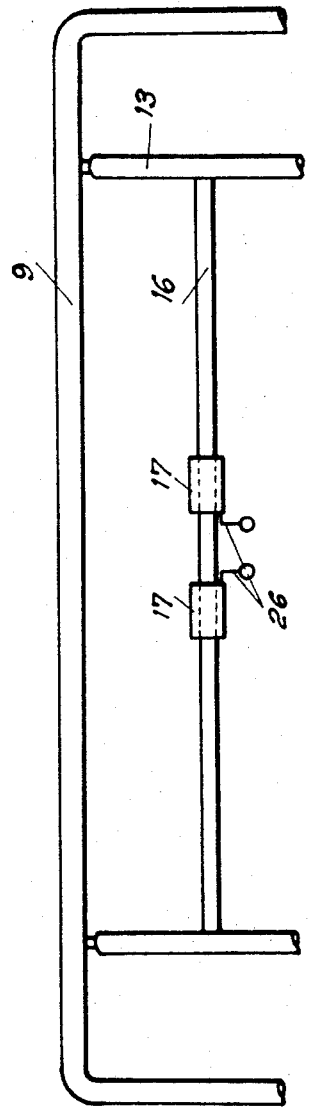
FIGURE 6 is a view similar to FIGURE 5 of another modification.

In the modification of FIGURE 6, two sleeves 17 are again provided and these are disposed in the median part of the tube 16 and each comprises an adjustment knob 26. The two knobs lie between the sleeves; it is thus possible, with one hand only, to cause the two to approach one another, which has the effect of the simultaneous unlocking of the two telescopic uprights.

Figure 7:
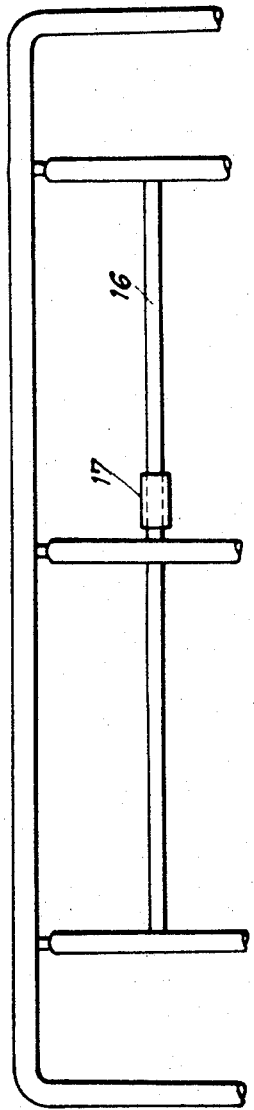
FIGURE 7 is likewise a view similar to FIGURE 5 of a further modification.

In the modification of FIGURE 7 there is provided, moreover, a telescopic upright 12, 13 which is in the median plane and it is this median upright which can be locked in the desired position.

It will be appreciated from the description given hereinbefore that the frame 9 of the back is held in the desired position in an effective and secure manner. The inclination of the back is however, readily changeable since it is sufficient to control the or each of the sleeves 17 or similarly of the knobs 26. The seat can be fully flattened forwardly by folding down towards the front, in the first place, of the back, and in the second place of the whole of the seat. In the embodiment of FIGURE 4, the seat may form a "couchette." Finally, the back cannot pivot forwardly in the case of shock and the passengers are protected in the case of sliding of the luggage placed to the rear of the seat by the frame formed by the two transverse tubes and the telescopic uprights.

It will be clear that the invention should not be considered as limited to the embodiments described and shown but covers on the contrary, all modifications. Thus, for example, the tubes 16 and 27 may be replaced by a lattice or a rigid wall, with the exception of a portion of the tube serving for location of the locking finger 20.

I claim:
1. A seat comprising:
    a lower seat,
    a seat back comprising a frame having two transversely spaced upright frame elements,
    said upright frame elements of said seat back being pivotally connected to said lower seat,
    telescoping means connecting an upper portion of said seat back to said lower seat,
    each of said telescopic means comprising a pair of members slidable one within the other at least one of which is provided with means for locking its two members together,
    one of each pair of members of each telescoping means being pivoted to an upper part of the seat back and the other of said pair being pivoted to the lower seat at a location disposed rearwardly of said pivotal connection between said seat back and said lower seat,
    said telescopic means being transversely spaced from another a distance different from the transverse spacing of said upright frame elements of the seat back,
    whereby the seat back may be tilted forward to a folded position in which the longitudinal axis of the telescopic means are disposed below the pivotal axis between the seat back and the lower seat.

2. A seat according to claim 1, wherein the inner member of said telescopic means has a plurality of holes spaced from one another, which allows locking of the back of the seat in several different positions.

3. A seat according to claim 1 wherein the pivotal axis between the lower seat and the upright frame elements of the seat back are located at a higher elevation than the pivotal axis between the lower seat and the telescopic means.

4. A seat according to claim 1 wherein said frame of said seat back comprises an upper transverse frame element connecting said two transversely spaced upright frame elements, said telescopic means being pivotally connected to said transverse frame element.

5. A seat according to claim 1 wherein said lower seat has fixed upright extensions, means pivotally connecting said transversely spaced frame elements of said seat back to said seat back extensions to provide a pivot axis at an elevation above the general plane of the lower seat.

6. A seat according to claim 1 further comprising a a transverse member connecting said two telescopic means, said locking means being carried on said transverse member to permit locking of the seat back in several different pivotal positions.

7. A seat according to claim 1 further comprising a base, and means pivotally connecting the front portion of said lower seat to said base, whereby the lower seat and seat back when in said folded disposition may be pivoted as a unit to a forward position to clear the space normally occupied by the seat.

References Cited
UNITED STATES PATENTS

| | | | |
|---|---|---|---|
| 2,160,482 | 5/1939 | McGregor | 297—378 |
| 2,514,524 | 7/1950 | Steele | 108—146 |
| 2,710,647 | 6/1955 | Dorton | 279—359 X |
| 2,987,112 | 6/1961 | Dorton | 297—365 X |
| 2,999,729 | 9/1961 | Semmelroth | 108—146 |
| 3,027,209 | 3/1962 | Nielsen | 108—146 |
| 2,515,261 | 7/1950 | Poskin | 297—364 |
| 3,224,808 | 12/1965 | Spielman | 297—378 X |

BOBBY R. GAY, Primary Examiner
GLENN O. FINCH, Assistant Examiner

U.S. Cl. X.R.
297—363